United States Patent Office 3,255,732
Patented June 14, 1966

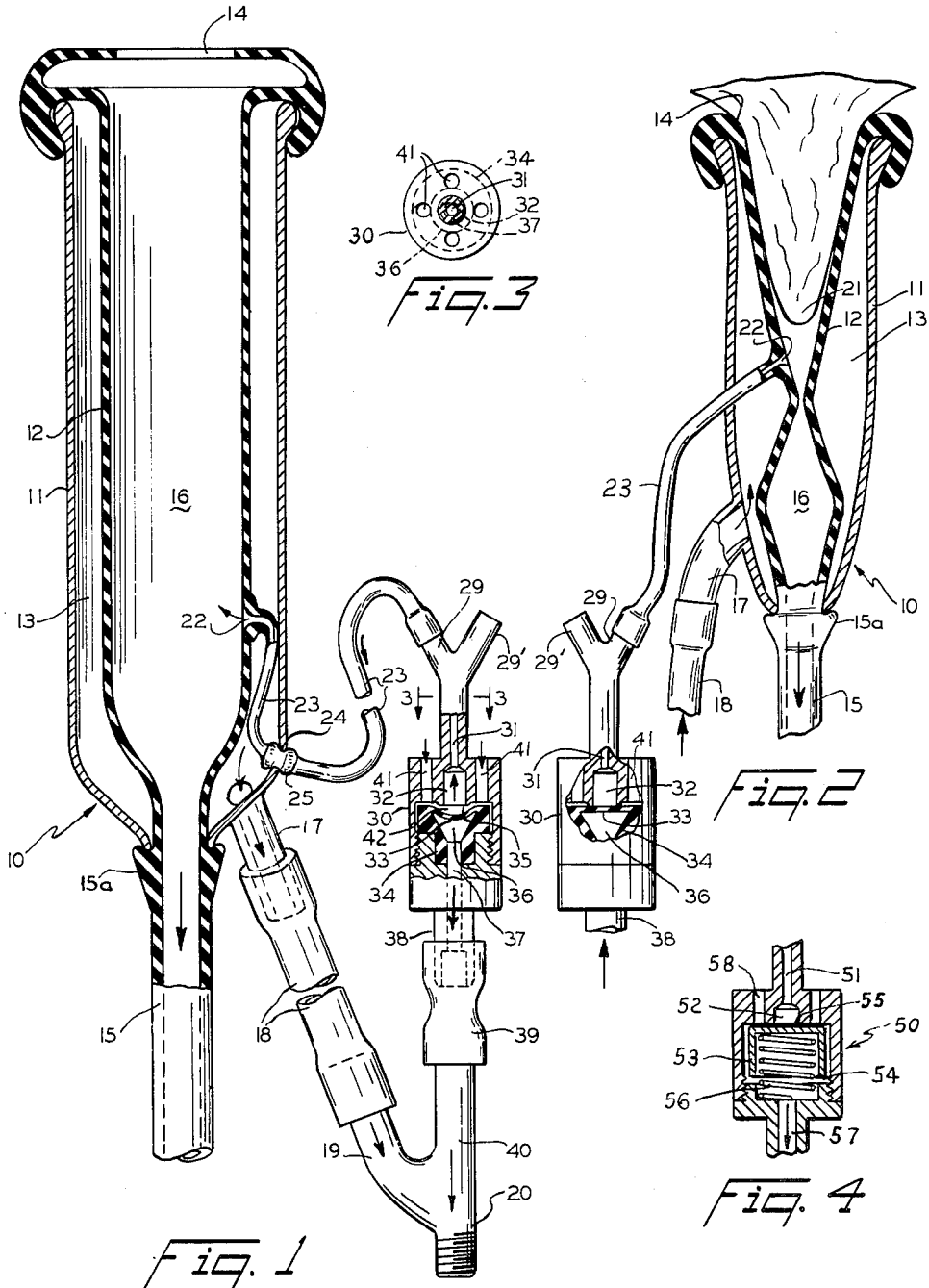

3,255,732
METHOD AND APPARATUS FOR TEAT CUP INFLATION CONTROL IN MACHINE MILKING
John W. Raht, P.O. Box 216, Vernon, N.Y.
Filed Sept. 28, 1964, Ser. No. 399,581
10 Claims. (Cl. 119—14.52)

This invention relates to milking machines and more particularly to a method and means for lessening the surges in negative pressure at the cow's teat during milking.

In the conventional teat cup for milking machines a metal shell and rubber inflation form the cup and it is held over the cow's teat by continuous suction or negative pressure supplied to the interior of the inflation, which suction also draws the milk down the milk tube. The space between inflation and shell is cyclically and recurrently first subjected to suction to distend the inflation during the expansion or milking stroke and then subjected to air at atmospheric pressure to collapse the inflation, during the massage stroke, about the cow's teat to prevent congestion therein.

While the partial vacuum supplied through the milk hose to the inflation interior may be as much as fifteen or sixteen inches of mercury at the source, the vacuum level at the teat may be as low as five or six inches for an easy-milking cow while the milk is flowing through the tube. During the massage stroke the flow of milk is briefly interrupted causing a change of pressure, and the collapse and distention of the inflation walls, by changing the volume of the chamber around the teat, also cause surges, or changes of pressure in the inflation interior. These changes of pressure are magnified by the weight of the milk in the tube and tend to slow the rate at which milk can be drawn through the tube as well as being irritating to the cow. The changes in pressure are irritating in themselves to the meatus, or milk opening, in the teat and, if the surges are great, air may be forced into the teat passage and carry irritation-causing bacteria into the passage.

The primary object of the invention, accordingly, is to provide a method and means for preventing surges in the level of vacuum in the inflation interior during milking.

Another important object is to provide a method and means for shortening the time required for milking a cow.

A further object is to provide means for lowering the vacuum level in the inflation interior during the milking stroke so milk may be drawn more quickly through the milk tube.

A still further object is to provide means for lowering the vacuum level in the inflation interior during the period in which distention of the inflation tends to raise this level, and to raise the level during the period during which collapse of the inflation tends to lower the level.

Another object is to provide valve means timed with the changes in pressure in the space between inflation and shell for regulating the pressure at the interior of the inflation.

Other objects and advantages will appear from the following description taken in conjunction with the accompanying drawing, in which:

FIGURE 1 is a longitudinal sectional view of a teat cup and associated parts according to the invention, and showing the parts in the position they assume during the milking stroke;

FIGURE 2 is a similar view thereof on a smaller scale showing diagrammatically the position of the parts during the massage stroke;

FIGURE 3 is a sectional view on the line 3—3 of FIGURE 1; and

FIGURE 4 is a longitudinal sectional view of a modified form of control valve.

Referring more particularly to FIGURE 1, a teat cup 10 comprises a metal shell 11 and a rubber inflation 12 in sealed engagement at both ends and defining therebetween a space 13. At one end the inflation is provided with a teat-receiving opening 14 and, at the other end, a milk tube 15 connects the interior 16 of the inflation to a source of vacuum in the usual manner.

A nipple 17, leading to space 13, is provided and it is connected by a flexible pulsator hose 18 to a nipple 19 of a bifurcated fitting 20. It will be understood that the fitting 20 is located at the claw, not shown, and is connected to a conduit which, by means of the usual pulsator mechanism, not shown, subjects the space 13 first to vacuum and then to atmosphere. Similar milk hoses 15 and pulsator hoses 18 lead from the claw to the other three cups, not shown, of the machine.

In the sidewall of inflation 12 within the lower portion of shell 11, and indicated in FIGURE 2 as adjacent the end of a cow's teat 21 in the inflation, an orifice 22 leads into a small flexible tube 23 which extends through an appropriate hole 24 in shell 11. An appropriate rubber bushing 25 is provided on the tube 23, like that provided on the milk tube 15 at 15a, to seal the tube 23 in the hole 24. Tube 23 is of sufficient length between orifice 22 and bushing 25 to permit the usual flexing of the inflation as it collapses and distends during milking.

Tube 23 extends, outside shell 11, to a nipple 29 on a valve housing 30. Another nipple 29', it will be understood, is connected by another hose 23, not shown, to the other teat cup which pulsates in phase with the cup 10.

Nipples 29 and 29' lead through a constricted conduit 31 to the valve passage 32 which is normally closed by the diaphragm 33 as shown in FIGURE 2. The diaphragm is a portion of a rubber member 34 carried in the valve housing 30 and its conformation normally biases the diaphragm against the valve seat 35 at the end of passage 32.

The member 34 has a chamber 36 therein which is connected by a passage 37 to the nipple 38. Nipple 38, in turn is connected by a tube 39 to another nipple 40 on the fitting 20 which subjects the chamber 36 to vacuum and atmosphere simultaneously with the changes in pressure in space 13.

On the other side of diaphragm 33 disposed about the passage 32 are a plurality of passages 41 through the housing wall exposing that side of the diaphragm to atmosphere.

In operation, when the teat cups 10 are engaged, in the usual manner, with the cow's teats, space 13 is connected through nipple 17, tube 18 and fitting 20 to rapidly alternating pulsations of vacuum and atmosphere. The inflation interior, and hence the cow's teat is continuously connected through the tube 15 to vacuum, the level of which, at the inflation interior, is dependent upon the amount of milk in tube 15, the nature of the individual cow, and other factors described above.

On each milking stroke, as space 13 is subjected to vacuum, the chamber 36 within the valve housing 30 is simultaneously subjected to vacuum and the diaphragm 33 is drawn away from the seat 30 forming a chamber 42 connecting orifices 41 to the valve passage 32. During the milking stroke, or expansion phase of the inflation, therefore, its interior 16 is subjected to air at atmospheric pressure through passage 32, conduit 31, nipple 29 and tube 23. Conduit 31, however, is constricted so that the flow of air through the orifice 22, indicated by arrows in FIGURE 1, is less than the flow of air and milk through the comparatively larger milk tube 15, also indicated by arrows in FIGURE 1. Therefore the level at the interior 16 is never raised to the point where the cup 10 might drop from the cow.

During the massage stroke, as shown diagrammatically in FIGURE 2, as soon as the space 13 is exposed to atmosphere through the fitting 20, the chamber 36, in valve 30, is likewise exposed to atmosphere, and diaphragm 33 closes the passage 32. The flow of air through tube 23 is shut off simultaneously with the initiation of the collapsing of inflation 12. During the time that the volume of the inflation interior 16 is decreasing and lowering the level of vacuum at the cow's teat, no air is being admitted to the interior 16 through the valve 30.

Milk does not necessarily cease to flow from the cow until the completion of the collapsing of the inflation at the end of the massage stroke, but the greatest flow of milk takes place during the milking stroke. As vacuum is applied to the space 13 again, diaphragm 33 instantaneously resumes the position shown in FIGURE 1 and during the period that the volume of the interior 16 is increasing, air flows through the tube 23 lowering the level of vacuum to compensate for the increase in vacuum level which otherwise would be caused by the distending of the inflation. Air continues to flow through tube 23 during the milking stroke, lowering the vacuum in the interior 16 and helping the flow of milk through the milk tube 15.

It has been found that the admission of a controlled amount of air to the interior 16 during the milking stroke as described above, not only increases the speed with which milk can be drawn through the milk tube 15, but decreases the time required for milking also because of the greater apparent comfort of the cow.

A modified form of control valve 50 is shown in FIGURE 4. The valve has a constricted conduit 51 adapted to be connected to the flexible tube 29 described above. Conduit 51 leads to the valve passage 52 which is normally closed by the piston 53 which is slidable in the chamber 54, the piston being biased against the seat 55 by the spring 56. Chamber 54 is connected by passage 57 in an appropriate nipple to a tube adapted to be connected to the fitting 20 described above. A plurality of passages 58 around the passage 52 through the valve housing admit air at atmospheric pressure to the top of the piston.

The operation of this valve is similar to the one described above in connection with FIGURES 1 and 2. When the chamber 54 is subjected to vacuum, the piston 53, forming one wall of the chamber, is moved against the biassing spring 56 away from its seat 55 and air at atmospheric pressure is admitted from the passages 58 through passage 52 and thence to the interior of the inflation.

On the initiation of the massage stroke of the machine, chamber 54 is exposed to atmosphere, as described above, and spring 56 moves piston 53 against its seat 55 again closing passage 52 and cutting off air to the inflation interior.

As will be apparent to those familiar with the art, the invention can be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. In a milking machine teat cup having a metal shell and a flexible inflation sealed at both ends therein, the space between inflation and shell being connected to pulsation means alternately subjecting said space to vacuum for distending the inflation and to atmosphere for collapsing it about the teat of a cow while the interior of the inflation is continuously connected by a milk tube to vacuum for extracting milk and holding the cup to the cow, the improvement comprising: a flexible tube in fluid communication with the inflation interior, valve means for alternately connecting the flexible tube to atmosphere and then shutting of the connection to atmosphere, the valve means being connected to and operated by said pulsation means, whereby the vacuum level in the inflation interior is lowered during the distention of the inflation.

2. A teat cup assembly for machine milking, comprising: a tubular metal-walled shell; a flexible-walled tubular inflation having a teat-receiving open end and a milk tube at the other end and having both ends in sealed engagement with the shell; a space between the shell and inflation; a pulsator tube adapted to connect said space cyclically, first to a source of vacuum, and then to atmosphere, the interior of said inflation being continuously connected during milking through the milk tube to a source of vacuum; a flexible tube leading to the inflation interior and in sealed engagement with the inflation wall and passing through the shell wall in sealed engagement therewith, the flexible tube being of sufficient length between the shell and inflation walls to permit flexing of the inflation wall; and valve means connected to the flexible tube and operated by change of pressure in the pulsator tube and admitting air at atmospheric pressure through the flexible tube to the inflation interior.

3. A teat cup assembly as defined in claim 2 wherein said valve means comprises a housing having a chamber in fluid communication with the pulsator tube, a flexible diaphragm forming one wall of the chamber, a first passage in the housing normally closed by the natural bias of the diaphragm and in fluid communication through the flexible tube with the inflation interior, and a second passage in the housing in fluid communication with atmosphere and adapted to be in communication with the first passage when the diaphragm is moved by vacuum in the chamber to open the first passage.

4. A teat cup assembly as defined in claim 2 wherein said valve means comprises a housing having a chamber in fluid communication with the pulsator tube, a spring biased piston moveable in the chamber and forming one wall of the chamber, a first passage in the housing normally closed by the piston and in fluid communication through the flexible tube with the inflation interior, and a second passage in the housing in fluid communication with atmosphere and adapted to be in communication with the first passage when the piston is moved by vacuum in the chamber to open the first passage.

5. In a milking machine teat cup having a metal shell and a flexible inflation therein, the inflation being in sealed engagement at both ends with the shell, a space between inflation and shell being connected to pulsation tube means alternately subjecting said space to atmospheric pressure for collapsing the inflation and then to suction for distending the inflation while the interior of the inflation is continuously subjected to suction by a milk tube leading thereto, the improvement comprising: a valve housing having a passage, a valve member normally biased to close the passage, a chamber in the housing in which said member forms a movable closure, said chamber being in communication with said pulsation tube means, and tubular means connecting said passage to the interior of the inflation, said member being movable by suction in the chamber to an open position connecting the passage to atmosphere, whereby air is admitted to said interior as the inflation is distended.

6. A teat cup for pulsating milking machines and admitting air to the interior of the cup under pulsation-control, comprising: a tubular metal-walled shell; a tubular flexible-walled inflation spaced from the shell, the inflation having a teat-receiving opening at one end and a milk tube at the other end for continuously connecting the interior of the inflation to a source of vacuum during milking, the shell and inflation being in sealed engagement at either end; a pulsator tube adapted to connect the space between shell and inflation alternately to a source of vacuum and to atmosphere for expanding and collapsing the inflation about the teat; a valve housing having a chamber in communication with the pulsator tube; a movable valve member in the housing forming one wall of said chamber and normally biased against its seat; a passage in the housing normally closed when the valve member is seated and open to atmosphere when the valve member is moved from its seat, said valve member being movable from its seat by pressure less than atmospheric in said chamber; and tubular means having at least one constricted portion and including a flexible tube portion, said tubular means connecting said valve passage to the inflation interior, said flexible tube being in sealed engagement with said shell and inflation and being of sufficient length between shell and inflation to permit expansion and collapsing of the inflation.

7. A teat cup assembly for machine milking comprising: a metal-walled shell, a flexible walled inflation having a teat-receiving opening at one end and a milk tube at the other end and having both ends in sealed engagement with said shell, a pulsator tube leading to the space between shell and inflation and adapted to connect said space to a source of vacuum during the milk stroke of the machine and to connect said space to atmosphere during the massage stroke, the milk tube being adapted to be continuously connected to said source of vacuum, and a pressure regulator valve having a flexible diaphragm normally seated and closing the valve passage, a chamber in the valve on one side of the diaphragm connected to the pulsator tube, a second chamber connected to atmosphere on the other side of the diaphragm and adapted to be connected to the valve passage when said diaphragm is unseated, tubular means including a restricted orifice connecting said passage to the interior of the inflation for providing a limited supply of air at atmospheric pressure to the interior of the inflation during the milk stroke of the machine.

8. A teat cup assembly as defined in claim 7 wherein said tubular means includes a flexible tube leading to the inflation interior and in sealed engagement with the inflation wall and passing through the shell wall in sealed engagement therewith, said flexible tube between the shell wall and inflation wall being of sufficient length to permit flexing of the inflation wall.

9. A method of machine milking employing a tubular metal shell and a tubular rubber inflation spaced therefrom and having an open end adapted to contain a cow's teat and to be closed by the cow's udder being held thereagainst by suction during milking, the inflation being sealed to the shell at both ends, comprising the cyclically recurrent steps of: first, applying suction to both the interior of the inflation and to the space between inflation and shell while allowing a metered amount of air at atmospheric pressure to be admitted to said interior at a point adjacent the end of the teat; and second, admitting air at atmospheric pressure to said space and cutting off air to said interior while maintaining the suction to said interior.

10. A method of machine milking employing a tubular metal shell and a tubular rubber inflation spaced therefrom and having an open end adapted to contain a cow's teat during milking, the inflation being sealed to the shell at both ends, comprising: continuously applying suction to the interior of the inflation for holding the inflation and shell against the cow and extracting milk, and the cyclically recurrent steps of: first, applying suction to the space between inflation and shell while allowing a limited flow of air at atmospheric pressure to said interior at a point adjacent the end of the teat; and, second, cutting off suction and admitting air at atmospheric pressure to said space, and, while maintaining suction on the interior, cutting off the flow of air to said interior.

References Cited by the Examiner
UNITED STATES PATENTS

| 1,822,680 | 9/1931 | Taylor | 119—14.53 |
| 2,531,266 | 11/1950 | Gierl | 119—14.31 |
| 2,775,955 | 1/1957 | Anderson | 119—14.36 |
| 2,944,514 | 7/1960 | Nesseth | 119—14.49 |

SAMUEL KOREN, *Primary Examiner.*

ALDRICH F. MEDBERY, *Examiner.*